No. 828,728. PATENTED AUG. 14, 1906.
G. FITZGERALD.
VEHICLE.
APPLICATION FILED NOV. 9, 1905.
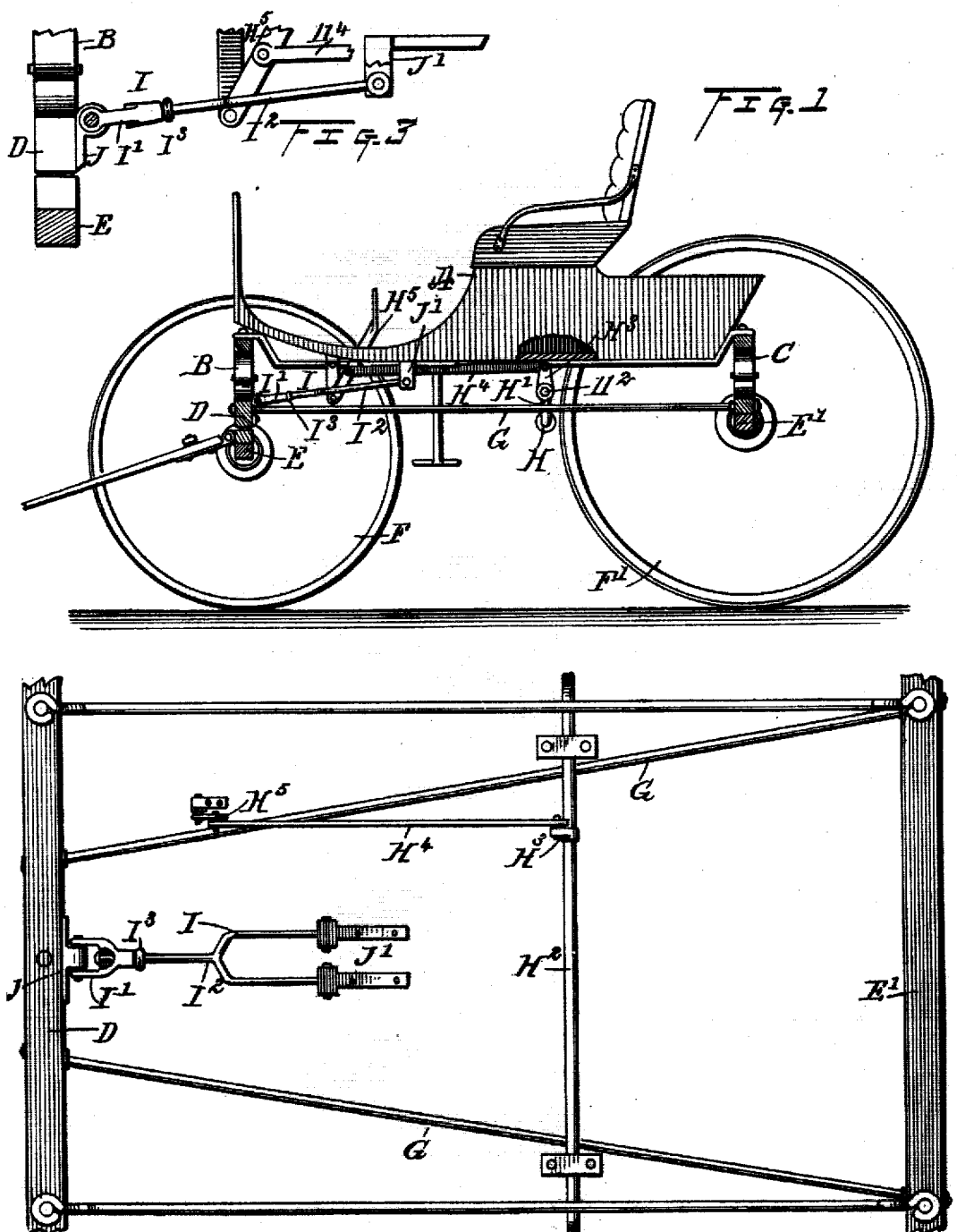
WITNESSES: INVENTOR
George Fitzgerald
BY
ATTORNEYS

UNITED STATES PATENT OFFICE.

GEORGE FITZGERALD, OF MONROE, NEW YORK.

VEHICLE.

No. 828,728.      Specification of Letters Patent.      Patented Aug. 14, 1906.

Application filed November 9, 1905. Serial No. 286,524.

*To all whom it may concern:*

Be it known that I, GEORGE FITZGERALD, a citizen of the United States, and a resident of Monroe, in the county of Orange and State of New York, have invented new and useful Improvements in Vehicles, of which the following is a full, clear, and exact description.

The invention relates to surreys and similar road-vehicles having spring-supported bodies; and its object is to provide certain new and useful improvements in vehicles, whereby the brake can be forcibly applied without danger of unduly shifting the vehicle-body lengthwise.

The invention consists of novel features and parts and combinations of the same which will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement, parts being shown in section. Fig. 2 is an enlarged bottom plan view of the vehicle-gear, parts being shown in section; and Fig. 3 is an enlarged side elevation of the brace and part of the brake mechanism.

The vehicle on which the improvement is applied consists, essentially, of a vehicle-body A, mounted on springs B and C, of which the spring B is attached to a front bolster D, mounted to turn in the usual manner on a front axle E, and the spring C is supported in the usual manner on a rear axle E'. On the axles E and E' are mounted the usual front and rear wheels F and F', and the rear axle E' is connected with the bolster D by the usual reach G.

The brake mechanism for the vehicle is of usual construction and consists of brake-shoes H, mounted on the crank-arms H' of a rock-shaft $H^2$, journaled in suitable bearings attached to the under side of the vehicle-body A, and on the said shaft $H^2$ is arranged an arm $H^3$, connected by a link $H^4$ with a foot-lever $H^5$, under the control of the operator seated in the vehicle-body A. When the operator presses the foot-lever $H^5$ forwardly, then the brake-shoes H are moved in engagement with the rear wheels F' to brake the vehicle A. In order to prevent the vehicle-body A from shifting in a lengthwise direction while applying the brake as described, a brace I is provided, connecting the vehicle-body A with the front bolster D, so as to prevent lengthwise movement of the vehicle-body A, especially when the brake mechanism is actuated as above described. The brace I is preferably made in parts or sections $I'$ $I^2$, connected with each other by a swivel $I^3$, and the section $I'$ is pivotally connected with a bracket J, attached to the front bolster D, and the section $I^2$ is pivotally connected with a bracket J', secured to the under side of the vehicle-body A.

By the arrangement described longitudinal movement of the vehicle-body A is prevented when applying the brake mechanism so as to permit the operator to forcibly move the brake-shoes H in engagement with the rear wheels F' to insure a proper braking of the vehicle. It will also be seen that by the use of the brace I the free up-and-down swinging motion of the vehicle A is not interfered with, and any sidewise or rocking of the vehicle A does not injure the brace I, as the latter is provided with the swivel $I^3$ to allow one of the brace-sections to turn on the other to accommodate sidewise rocking movement.

In practice it may in some cases be desirable to connect the wagon-body A by the brace I with the rear bolster instead of the front bolster D, as shown and described. By the use of the brace the body A is held against undue longitudinal movement in case the eyes of the springs B and C are worn The device is very simple and durable in construction, can be cheaply manufactured, and readily applied to vehicles as at present constructed.

Having thus described my invention, I claim as new and desire to secure by Letters Patent—

1. A vehicle comprising a running-gear, a body, springs connecting the body to the rear axle and to the bolster on the front axle, a brake mechanism controlled by the operator seated on the said body, and having brake-shoes engaging the rear wheels of the running-gear, and a longitudinally-extending brace having a pivotal connection at one end with the body and at the other end with the bolster, said brace comprising a plurality of sections connected together by a swivel-joint.

2. A brace for connecting the body and the running-gear of a vehicle, comprising a brace-rod composed of a plurality of sections connected by a swivel-joint, the free end of one of said sections being pivotally connected with the running-gear, and the free end of the other section being pivotally connected to the body.

In testimony whereof I have signed my name to this specification in the presence of two subscribing witnesses.

GEORGE FITZGERALD.

Witnesses:
W. R. BULL,
STEPHEN H. ARNOLD, Jr.